May 17, 1960 — E. R. ZIEGLER — 2,936,476
WINDSHIELD CLEANING SYSTEM
Filed Jan. 10, 1958 — 2 Sheets-Sheet 1

INVENTOR.
EUGENE R. ZIEGLER
BY
M. H. Strickland
HIS ATTORNEY

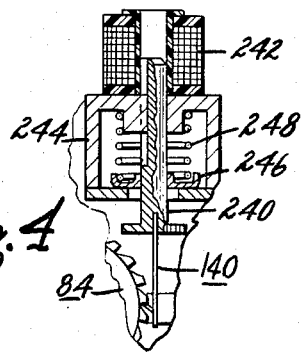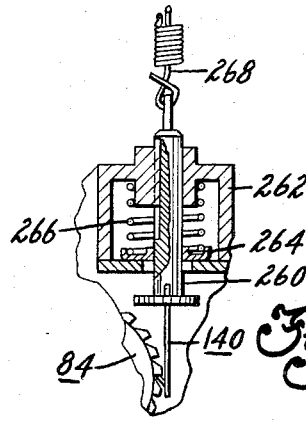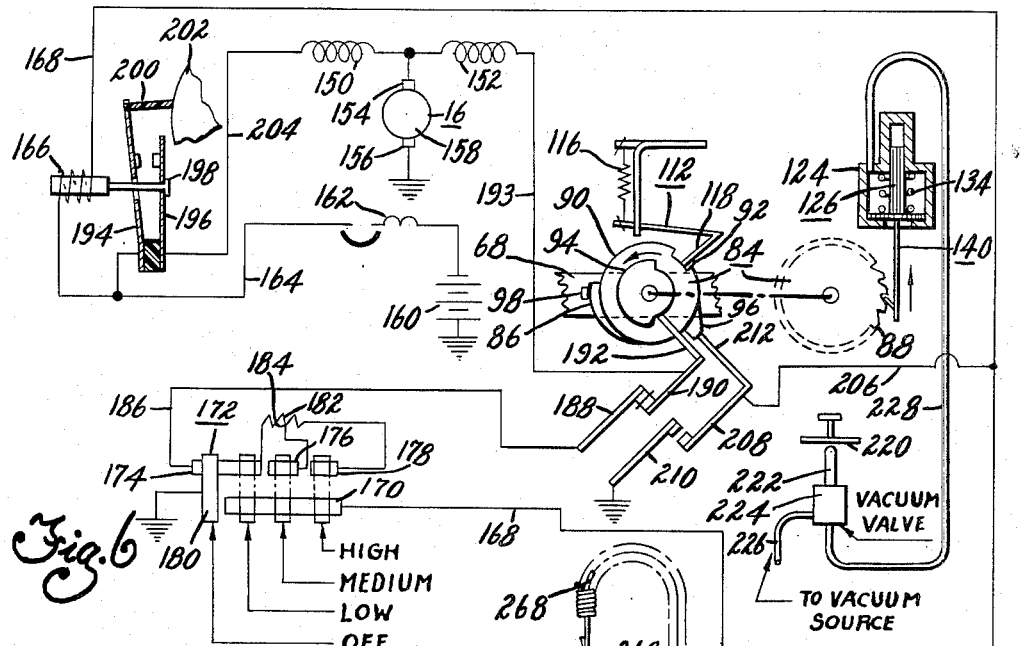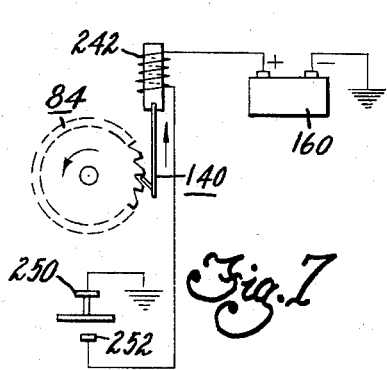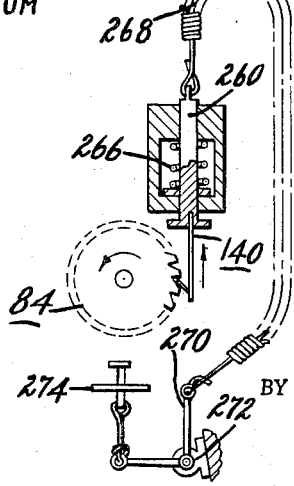

United States Patent Office 2,936,476
Patented May 17, 1960

2,936,476

WINDSHIELD CLEANING SYSTEM

Eugene R. Ziegler, Spencerport, N.Y., assignor to General Motors Corporation, Detroit, Mich., a corporation of Delaware Application January 10, 1958, Serial No. 708,240

20 Claims. (Cl. 15—250.02)

This invention pertains to the art of windshield cleaning, and particularly to a system wherein liquid solvent is sprayed onto a windshield in timed relation with movement of a wiper blade thereacross to clean the windshield.

In my earlier application Serial No. 634,867, now Patent No. 2,878,505, a windshield cleaning system is disclosed comprising a wiper unit and a washer unit together with means for effecting conjoint operation of both units. The washer unit is operated for a predetermined number of strokes and then automatically arrested, and the wiper unit operates for a second predetermined number of strokes to dry the windshield and is then automatically arrested. However, in my prior system the wiper unit becomes operative before liquid solvent is applied to the windshield, and in some instances it is desirable to apply liquid solvent to the windshield prior to initiating operation of the wiper unit. The present invention relates to a modified cleaning system of the general type shown in copending Serial No. 674,495, filed July 26, 1957, in the name of Harry W. Schmitz, et al., and assigned to the assignee of this invention, including means for applying liquid solvent to the windshield prior to initiating operation of the wiper unit during an automatic cycle wherein the wiper unit and the washer unit are operated conjointly.

Accordingly, among my objects are the provision of a motor driven intermittent squirt type washer pump which is arrested in the charged condition; the further provision of a washer pump actuated by a wiper motor including means for interrupting the driving connection between the wiper motor and the washer pump and means for effecting a delivery stroke of the washer pump independently of the wiper motor; and the still further provision of a windshield cleaning system including a wiper unit and a washer unit and means for effecting conjoint operation of the washer unit and the wiper unit wherein liquid solvent is applied to the windshield prior to initiating operation of the wiper unit.

The aforementioned and other objects are accomplished in the present invention by embodying means for effecting a delivery stroke of the pump prior to initiating operation of the wiper unit during conjoint operation of the wiper unit and the washer unit. Specifically, the cleaning system of this invention may include a wiper unit of the type disclosed in copending application Serial No. 686,432 filed September 26, 1957, in the name of Harry W. Schmitz et al. and assigned to the assignee of this invention. Thus, the wiper unit includes a unidirectional electric motor which has a continuous driving connection with a crank assembly for oscillating a pair of wiper blades over asymmetrical paths across the surface of a vehicle windshield. The washer unit comprises an intermittent squirt type pump having an interruptible driving connection with a wiper motor. When the driving connection between the pump and the motor is established, the washer pump delivers intermittent squirts of liquid solvent onto the windshield in timed relation with movement of the wiper blades thereacross for a predetermined number of wiper strokes. The washer unit is automatically arrested after the predetermined number of wiper strokes, while the wiper unit continues to operate for a second predetermined number of wiper strokes, constituting a drying cycle, after which the wiper unit may be automatically arrested.

In order to achieve the objective of applying liquid solvent prior to initiating operation of the wiper unit during conjoint operation of the wiper unit and the washer unit, the washer pump is arrested in the charged, or loaded, position. The washer pump is of the type which has a spring actuated delivery stroke and a wiper motor actuated intake stroke. Accordingly, it is only necessary to release the pump arresting device to effect the delivery stroke prior to initiating operation of the wiper unit to accomplish the desired result of applying liquid solvent to the windshield before the wiper blades are moved thereacross.

In the present invention, three embodiments of means for obtaining this result are disclosed, namely, a fluid pressure differential motor, an electromagnet, and a manually actuated Bowden wire. All of these devices have an operative connection with a stroke counting device which controls the operation of the washer unit and the wiper unit during conjoint operation and also controls the interruption of establishment of the driving connection between the wiper motor and the pump.

Further objects and advantages of the present invention will be apparent from the following description, reference being had to the accompanying drawings, wherein preferred embodiments of the present invention are clearly shown.

In the drawings:

Figure 4 is a fragmentary view similar to Figure 2 illustrating an electromagnet as the initiating device.

Figure 5 is a view similar to Figure 4 disclosing the use of a manually controlled Bowden wire as the initiating device.

Figure 6 is an electrical schematic of the circuits for energizing the wiper motor for independent actuation or conjoint operation with the washer unit with a vacuum controlled starting device.

Figure 7 is a fragmentary schematic view similar to Figure 6 indicating an electromagnetic starting device.

Figure 8 is a fragmentary view similar to Figure 7 indicating a manually controlled Bowden wire starting device.

Figure 1:
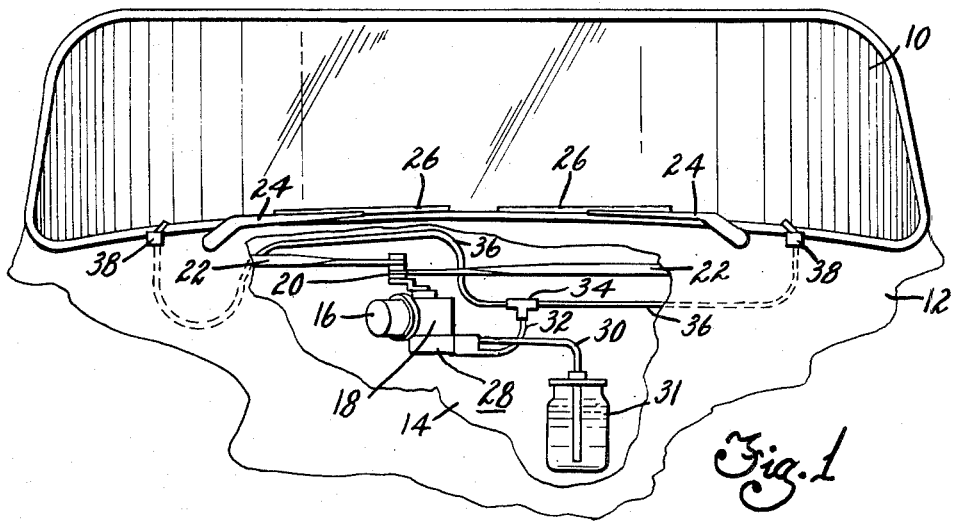
Figure 1 is a fragmentary view with certain parts broken away, depicting a motor vehicle equipped with the windshield cleaning system of this invention.

With particular reference to Figure 1, a portion of a motor vehicle is shown including a windshield 10, a cowl 12 and a firewall 14. The windshield cleaning system includes a wiper unit comprising a unidirectional electric motor 16 having a gear box housing 18 to which a crank assembly 20 is drivingly connected. The crank assembly 20 is continuously connected to rotate upon rotation of the motor 16, and the crank assembly may have a running orbit and a parking orbit such as disclosed in the aforementioned copending application Serial No. 686,432. The inner ends of connecting links 22 are rotatably connected to the crank assembly 20, the outer ends of the links 22 being operatively connected to pivot shafts, not shown, to which wiper arms 24 are drivingly connected. The wiper arms carry wiper blades 26 which can be moved over asymmetrical paths across the outer surface of the windshield throughout a running stroke wherein the inboard stroke limit is above the cowl 12, and a parking stroke wherein the inboard stroke limit is against the cowl, as shown.

The cleaning system also includes a washer unit comprising a washer pump and control mechanism 28 attached to the gear box assembly 18, the pump being connected to an intake conduit 30 which communicates with a liquid solvent reservoir 31. The pump is also connected to an outlet conduit 32 and a T-coupling 34, to which delivery hoses 36 are connected. The hoses 36 connect with nozzles 38 through which liquid solvent may be discharged onto the windshield into the paths of the moving wiper blades, and in timed relationship therewith.

Figure 2:
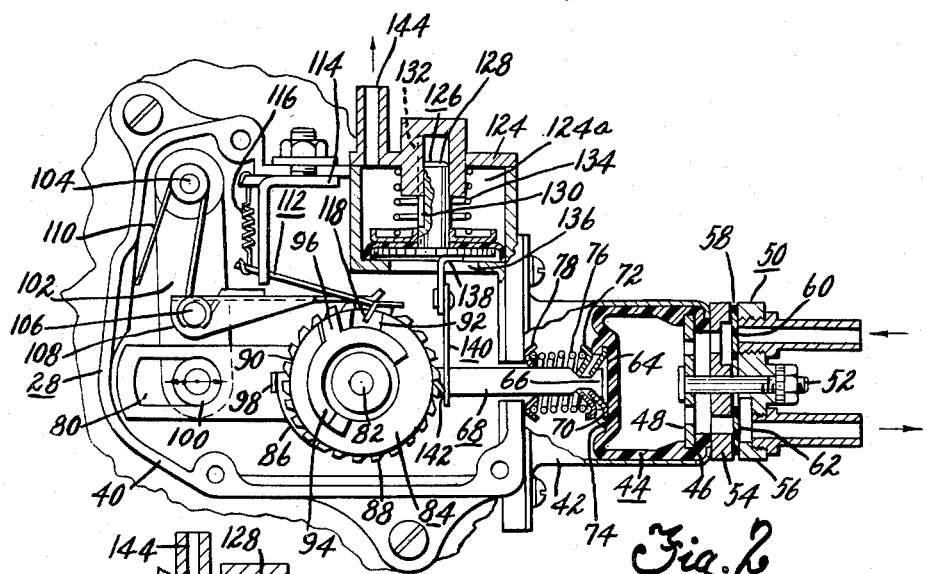
Figure 2 is a fragmentary view, partly in section and partly in elevation, of the washer pump and stroke counting device shown in the "off" position and one of the starting means.

With reference to Figure 2, the pump and control assembly 28 includes a control assembly housing 40 and a pump housing 42 attached thereto. A flexible bulb, or bellows 44, is disposed within the housing 42, the bulb having an open end formed with a lip 46. The lip 46 is clamped between a perforated plate 48 and a check valve assembly 50 by a bolt 52. The check valve assembly 50 comprises a base plate 54, a cap 56 and an intermediate rubber disc 58 having a flap-type inlet check valve 60 and a flap-type outlet check valve 62.

The closed end of the bulb 44 is formed with a depression 64 which receives the enlarged end 66 of a reciprocable pump rod 68. The enlarged end 66 is drivingly connected with the bulb 44 by a pair of washers 70 and 72 which embrace a lip 74 surrounding the depression 64 in the bulb. The washer 72 also constitutes a spring seat for one end of a coiled compression spring 76, the other end of which engages a spring seat 78 that circumscribes the pump rod 68 and abuts the housing 40. The spring 76 is capable of collapsing the bellows 44 to effect the delivery stroke thereof.

The pump rod 68 has a pair of elongated slots therein, one of which 80 is depicted in the drawing. A stud shaft 82 extends through the other elongated slot in the pump rod to facilitate reciprocable movement of the pump rod relative to the shaft 82. A ratchet cam assembly 84 is mounted for rotation in only one direction about the stub shaft 82, namely the counterclockwise direction as viewed in Figure 2. The ratchet cam assembly includes a lockout cam portion 86 extending throughout substantially 180°, a ratchet toothed portion 88, a cylindrical peripheral portion 90 having a notch 92, and a pair of face cams 94 and 96. The pump rod 68 is formed with an upstruck lug 98 which is engageable with the lockout cam 86 in the position shown in Figure 2.

One end of a cam follower roller 100 extends through the elongate slot 80 in the pump rod. The other end of the cam follower 100 engages a cam formed on the worm gear, not shown, which is rotated when the motor 16 is energized. This construction is shown in the aforementioned copending application Serial No. 674,495. The cam follower 100 is carried by a lever 102 pivotally mounted on a pin 104 in the housing 40. The lever 102 has a second pin 106 about which a drive pawl 108 is pivotally mounted. The lever 102 is biased by a hairpin spring 110 so that the roller is maintained in engagement with the worm gear cam. The hairpin spring 110 also resiliently urges the drive pawl 108 towards the ratchet cam assembly 84.

Reference to the aforementioned copending application Serial No. 686,432 will indicate that a complete revolution of the worm gear driven by the motor results in an inboard and an outboard stroke of the wiper blades 24, and thus the pump actuating cam which is integral with the worm gear is capable of actuating the pump rod 68 through the follower 100 in timed relation with the stroking movement of the wiper blades. Moreover, drive pawl 108 is reciprocated in timed relation with the stroking movement of the wiper blades. The follower 100 engages the worm gear cam at all times, and thus whenever the motor 16 is energized and the worm gear is rotating, the lever 102 will move about its pivot pin 104, with the roller 100 moving in the slot 80 so that when the lug 98 engages the lockout cam 86, movement of the pump rod 68 to the right as viewed in Figure 2 is precluded. Moreover, the length of the slot 80 is equivalent to the throw of the cam, so that no movement is imparted to the pump rod 68 when the lug 98 engages the lockout cam 86. At the same time, the drive pawl 108 is reciprocated, but such reciprocation will not impart movement to the ratchet cam assembly 84.

As seen in Figure 2, a ramp member 112 is pivotally mounted on a bracket 114 attached to the housing, the ramp member 112 being biased into engagement with the ratchet cam assembly 84 by a spring 116. The ramp member 112 has a follower portion 118 aligned with the notch 92 in the ratchet cam assembly when the ratchet cam assembly is in the "off" position as shown in Figure 2. As long as the ramp member 112 remains in this position, reciprocation of the drive pawl will be ineffective to rotate the ratchet cam 84, since the driving portion of the drive pawl 108 rides upon the ramp 112 and does not engage the ratchet teeth 88.

Figure 3:
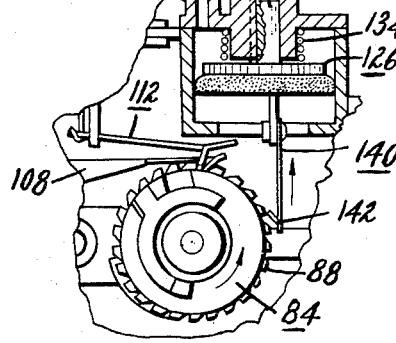
Figure 3 is a fragmentary view similar to Figure 2 showing the stroke counting device in the "on" position.

In order to establish the driving connection between the pawl 108 and the ratchet teeth 88, and likewise establish the driving connection between the follower 100 and the pump rod 68, it is necessary to move the ratchet cam assembly 84 in the counterclockwise direction, as viewed in Figure 2, throughout a distance of one ratchet tooth. Three embodiments of a starting device for accomplishing this purpose are disclosed herein. In the first embodiment, as shown in Figures 2 and 3, a cylinder 124 is formed in the housing 40. A reciprocable piston 126 is disposed within the cylinder, the piston having a rod 128 with a key-way slot 130 aligned with a key 132 so as to prevent rotation of the piston. The piston 126 is normally biased to the position shown by a coil spring 134. The cylinder 124 has an open end as indicated by numeral 136, and the piston has a bracket 138 attached thereto. A wire drive pawl 140 having a hooked end 142 is attached to the bracket 138. When the cylinder chamber 124a above the piston 126 is subjected to subatmospheric pressure, such as manifold vacuum, the piston 126 will move from the position of Figure 2 to the position of Figure 3. Subatmospheric pressure is communicated to the cylinder chamber through nipple 144. When the piston 126 moves from the position of Figure 2 to the position of Figure 3, hooked end 142 of a wire pawl 140 engages a ratchet tooth 88 and moves the ratchet cam assembly 84 throughout the distance of one tooth in the counterclockwise direction to the position of Figure 3. This movement lifts the follower portion 118 out of the notch 92 so that the follower portion rides upon the cylinder surface 90, in which position the drive pawl 108 can engage the ratchet teeth 88 so as to impart step by step movement to the ratchet cam assembly 84.

A single step movement of the ratchet cam assembly in the counterclockwise direction, also disengages the lug 98 and the lockout cam 86, enabling the spring 76 to compress the bellows 44 and discharge a squirt of water through the nozzles 38 onto the windshield 10. This is true since when the washer unit is arrested, the bellows, or bulb, 44 is expanded, and is in the charged condition so that upon releasing the lug 98 from engagement with the lockout cam 86, the spring 76 will compress the bulb to effect a delivery stroke thereof.

With reference to Figure 6, the energizing circuit for the wiper motor 16 to effect independent operation of the wiper unit, or conjoint operation of the wiper unit and the washer unit, will be described. The motor 16 is of the compound wound type, and thus includes a series field winding 150 and a shunt field winding 152. The inner ends of the two windings are connected to a commutator brush 154, the other brush 156 being connected to ground. The motor also includes an armature 158 electrically connected with the brushes through the commutator. The motor 16 can be energized from a battery 160, having one terminal connected to ground and the other terminal connected to an overload switch 162 through a wire 164. The wire 164 connects with one end of a relay coil 166, the other end of which is connected to a wire 168. The wire 168 is connected with a stationary switch contact 170.

The stationary switch contact 170 forms a part of a manually operable wiper unit control switch 172. The switch 172 also includes stationary contacts 174, 176 and 178, and a movable bridging contact 180 which is connected to ground. Contacts 174 and 178 are connected by a resistor 182, and contact 176 is connected to a center tap 184 of the resistor 182. The contact 174 is also connected to a wire 186, the other end of which is connected to a switch contact 188. Switch contact 188 is engageable with a switch contact 190 having a follower 192 engageable with a face cam 94 on the ratchet cam assembly 84. The switch contact 190 is connected to a wire 193 which connects with the other end of the shunt field winding 152.

The wire 164 is also connected to switch contact 194 which is engageable with a second switch contact 196. The switch contact 196 is connected for movement with a plunger 198 which moves to the left, as viewed in Figure 6, when the relay coil 166 is energized. The switch contact 194 carries a follower 200 which can be engaged by a cam 202 when the crank assembly operates in its parking orbit. Irrespective of whether the follower 200 is engaged by the cam 202, or not, upon energization of the coil 166, movement of the plunger 198 will move the contact 196 into engagement with contact 194. The contact 196 is connected to wire 204 which connects with the other end of the series field winding 150. In addition, the wire 168 is connected to a wire 206 that connects with a switch contact 208. Contact 208 is engageable with a contact 210 that is connected to ground. Contact 208 carries a follower 212 engageable with face cam 96 of the ratchet cam assembly.

Operation of the wiper unit alone is controlled by the switch 172. When the bridging contact 180 is moved to the low speed position, the relay coil 166 will be energized from the battery, through overload switch 162, wire 164, the coil 166, wire 168 and contacts 170 and 180. Switch contact 196 will be moved into engagement with switch contact 194 so as to energize the motor 16 from the battery 160, through the overload switch 162, wire 164, switch contacts 194 and 196, wire 204, the series field winding 150, the brush 154, the armature 158 and the brush 156. The shunt field winding 152 will likewise be fully energized from the series field winding through wire 193, switch contacts 188 and 190, wire 186 and switch contacts 174 and 180. As the shunt field winding 152 is fully energized, the motor 16 operates at low speed.

When the switch contact 180 is moved to the medium speed position, wherein to bridge contacts 176 and 170, a portion of resistor 182 is connected in series with the shunt field winding 152 so as to reduce the energization thereof, and thus increase the motor speed. When the bridging contact 180 is moved to high speed position so as to bridge contacts 178 and 170, the entire resistor 182 will be connected in series with the shunt field winding 152 so as to further reduce the energization thereof and further increase the motor speed.

When the movable switch contact 180 is moved to the "off" position, the relay coil 166 is deenergized. However, contact 194 remains in engagement with contact 196, until the crank assembly 20 moves into its parking orbit and the wiper blades arrive at the depressed parked position against the cowl of the vehicle. When the wiper blades arrive at the depressed parked position, the cam 202 engages the follower 200 to separate contacts 194 and 196 and thereby deenergize the motor 16.

To initiate conjoint operation of the wiper unit and the washer unit, a button 220 is depressed. The button may be spring loaded, so that upon release thereof it will return to its normal projected position. The button 220 engages a stem 222 of a vacuum valve 224. When the stem 222 is pushed inwardly, the valve 224 interconnects vacuum supply conduit 226 with conduit 228, the conduit 228 communicating with the cylinder 124. When the cylinder 124 is subjected to vacuum, the piston 126 moves upwardly so that the wire pawl 140 imparts movement to the ratchet cam assembly 84 throughout a distance of one tooth in the counterclockwise direction. After this has been accomplished, the button 220 will be released, thereby permitting the spring 134 to restore the piston 126 to its lower position. When the button 220 is released, the valve 224 connects the conduit 228 to atmosphere.

As soon as the ratchet cam assembly 84 moves throughout the distance of one tooth in the counterclockwise direction, the follower 212 is disengaged from the face cam 96, so that contact 208 engages contact 210. In addition, follower 192 engages face cam 94 so that contact 190 is disengaged from contact 188. Furthermore, as soon as the ratchet cam 84 moves throughout a distance of one tooth, the lug 98 is disengaged from lockout cam 86 permitting the spring 76 to collapse the bulb 44 whereby liquid solvent will be applied to the surface of the windshield. Engagement between contacts 208 and 210 energizes the relay coil 166 which closes the parking switch contacts 194 and 196 to energize the motor 16. Disengagement of contacts 188 and 190 opens the shunt field winding 152 so that the motor 16 will run at high speed as a series motor. In addition, movement of the ratchet cam assembly 84 throughout a distance of one tooth causes the follower 118 of the ramp 112 to ride upon the cylindrical surface 90 thereby establishing a driving connection between the drive pawl 108 and the ratchet teeth 88. Consequently, the ratchet cam 84 will be moved in step by step fashion in the counterclockwise direction by the pawl 108 which is driven by the lever 102. The lever 102 is driven by the follower 100 which will reciprocate the pump rod 68 so that liquid solvent will be intermittently squirted onto the windshield. As soon as the ratchet cam has rotated throughout an angular distance of substantially 180°, the lug 98 will reengage the lockout cam 86 so as to interrupt the driving connection between the pump rod 68 and the follower 100. Simultaneously with automatic arresting of the washer pump, the follower 192 will be disengaged from the cam 94 permitting contact 190 to reengage contact 188 so that the shunt field winding 152 will be fully energized, and thus the motor 16 will rotate at slow speed throughout the drying cycle.

When the ratchet cam assembly has completed one revolution the follower 118 is aligned with the notch 92 so that the spring 116 forces the ramp 112 thereinto so that the driving connection between the pawl 108 and the ratchet cam is interrupted. At the same time the follower 212 engages the face cam 96 to disengage contacts 208 and 210. When the contacts 208 and 210 are disengaged the relay coil 166 is deenergized. However, the motor 16 continues to be energized and crank assembly 20 is moved to the parking orbit.

When the blade 26 arrives at the depressed parked position the cam 202 engages the follower 200 to separate contacts 194 and 196 and deenergizes the motor. Thus, the wiper unit and the washer unit have completed an automatic cleaning cycle wherein liquid solvent is first applied to the windshield after which the washer unit and the wiper unit are operated conjointly for a predetermined number of strokes; the washer unit is then automatically arrested, and the wiper unit continues to operate at slow speed throughout a drying cycle for a second predetermined number of wiper strokes until the ratchet cam assembly completes a full revolution, after which the wiper unit is automatically arrested and the wiper blades are parked.

With reference to Figures 4 and 7, a modification of the starting device is disclosed wherein the starting pawl 140 is carried by an armature 240 of an electromagnet 242. The armature 240 is keyed to a housing 244 to prevent rotation thereof. In addition, the armature 240 has a collar 246 attached thereto, one end of a coil spring 248 bearing against the collar. The spring 248 projects the pawl and the armature 240 to the position shown in Figure 4 and the electromagnet is deenergized.

As seen in Figure 7, the washer unit control comprises a switch 250 engageable with a contact 252 for energizing the electromagnet 242. When the electromagnet 242 is energized the pawl 140 is moved upwardly to impart a one tooth rotational movement to the ratchet cam assembly 84. The other parts of the washer assembly with the electromagnetic starting device are identical to the system described in conjunction with the first embodiment.

With reference to Figures 5 and 8, in a further modification, the starting pawl 140 is connected to a plunger 260 keyed to a housing 262 so as to be restrained against rotation. The plunger 260 carries a collar 264 against which the end of spring 266 rests. The other end of the spring 266 engages the housing 262. The plunger 260 is connected to the end of a Bowden control wire 268. As seen in Figure 8, the other end of the Bowden wire 268 is connected to a bellcrank 270. The bellcrank has an intermediate pivot 272, and the other end of the bellcrank is connected to an actuator 274. When the actuator 274 is pushed inwardly, the bellcrank 270 is pivoted in the counterclockwise direction thereby pulling the Bowden wire 268, the plunger 260 and the pawl 140 to impart a one step movement to the ratchet cam assembly 84. When the actuator 274 is manually released, the spring 266 will restore the mechanism to the position shown in Figure 8. The remaining components of the Bowden wire initiated system are identical to those aforedescribed.

From the foregoing it is apparent that the present invention incorporates means for discharging liquid solvent onto the windshield prior to initiating operation of a wiper unit during an automatic cleaning cycle in which the wiper unit is operated conjointly with the washer unit. Moreover, the initial delivery of the liquid solvent is effected independently of the wiper motor which actuates the washer unit throughout the remaining portion of the automatic cleaning cycle.

While the embodiments of the invention as herein disclosed constitutes preferred forms, it is to be understood that other forms might be adopted.

What is claimed is as follows:

1. A windshield cleaning system including, a washer unit, a wiper unit, means operable to sequentially actuate said washer unit to deliver liquid solvent and thereafter set both units in operation for conjoint operation, and stroke counting means operable during said conjoint operation to continue operation of the washer unit for a predetermined number of strokes of said wiper unit and then automatically arrest said washer unit.

2. A windshield cleaning system including, a washer unit, a wiper unit, manually operable control means for sequentially initiating operation of said washer unit to effect delivery of liquid solvent and then effect conjoint operation of the washer unit and the wiper unit, and stroke counting means operable during said conjoint operation to continue operation of the washer unit for a predetermined number of strokes of said wiper unit and then automatically arrest said washer unit.

3. A windshield cleaning system including, a washer unit, a wiper unit, means to activate said washer unit to deliver liquid solvent onto a windshield, means controlled automatically by said first recited means to set both units in operation for conjoint operation, and stroke counting means actuated during said conjoint operation for continuing operation of said washer unit for a predetermined number of strokes of said wiper unit and then automatically arresting said washer unit.

4. The cleaning system set forth in claim 3 wherein said first recited means includes a pressure differential actuated motor.

5. The cleaning system set forth in claim 3 wherein said first recited means includes an electromagnet.

6. The cleaning system set forth in claim 3 wherein said first recited means includes a manually operable Bowden wire.

7. A windshield cleaning system including, a wiper unit, a washer unit, a single motor for actuating both units, said motor having a continuous driving connection with said wiper unit and an interruptible driving connection with said washer unit, and means operable independently of said motor for actuating said washer unit to deliver liquid solvent.

8. A windshield cleaning system including, a wiper unit, a washer unit, a single motor for actuating both units, said motor having a continuous driving connection with said wiper unit, and an interruptible driving connection with said washer unit, means operable independently of said motor for actuating said washer unit to deliver liquid solvent, and means controlled automatically upon actuation of said washer unit to deliver liquid solvent for setting both units in operation for conjoint operation.

9. A windshield cleaning system including, a wiper unit, a washer unit, a single motor for actuating both units, said motor having a continuous driving connection with said wiper unit and an interruptible driving connection with said washer unit, means operable independently of said motor for actuating said washer unit to deliver liquid solvent, means controlled automatically upon actuation of said washer unit to deliver liquid solvent for setting both units in operation for conjoint operation, and stroke counting means actuated during said conjoint operation for continuing operation of said washer unit for a predetermined number of strokes of said wiper unit and then automatically arresting said washer unit.

10. A windshield cleaning system including, a wiper unit, a washer unit, an electric motor having a continuous driving connection with said wiper unit and an interruptible driving connection with said washer unit, means to effect actuation of said washer unit to deliver liquid solvent independently of energization of said electric motor, and an energizing circuit for said motor completed upon actuation of said washer unit to deliver liquid solvent and establishing the driving connection between said motor and said washer unit to set both units in operation for conjoint operation.

11. The cleaning system set forth in claim 10 including a second circuit for energizing said motor without establishing the driving connection between said motor and said washer unit to effect independent operation of said wiper unit.

12. The cleaning system set forth in claim 10 wherein said washer unit includes a pump, resilient means for effecting the delivery stroke of said pump, said motor being operable to effect the intake stroke of said pump when the driving connection therebetween is established, and wherein said system includes means for automatically arresting operation of said pump by interrupting the driving connection between said motor and said pump after said wiper unit has completed a predetermined number of strokes during said conjoint operation.

13. The cleaning system set forth in claim 12 wherein said last recited means includes a ratchet cam assembly, and wherein said pump is charged when it is arrested, and wherein the means for actuating the washer unit to deliver liquid solvent independently of said motor includes a drive pawl for moving said ratchet cam assembly to enable said resilient means to effect a delivery stroke of said pump.

14. A washer pump for a vehicle windshield including, a motor, a reciprocable rod operable by said motor, a pump including a fluid displacing member having an intake stroke and a delivery stroke connected to said rod, resilient means engaging said rod and effecting the delivery stroke of said pump, cam means engageable with said rod for preventing reciprocation thereof, and means for displacing said cam means to permit said resilient means to effect a delivery stroke of said pump independently of said motor.

15. A washer pump for a vehicle windshield including, a motor, a reciprocable rod operable by said motor, a pump including a fluid displacing member having an intake stroke and a delivery stroke connected to said rod, resilient means engaging said rod and effecting the delivery stroke of said pump, a ratchet cam assembly including cam means engageable with said rod for preventing reciprocation thereof, and a reciprocable pawl operable to impart a one tooth movement to said ratchet cam assembly so as to displace said cam means and permit said resilient means to effect a delivery stroke of said pump independently of said motor.

16. The pump set forth in claim 15 wherein said pawl is actuated by a pressure differential motor.

17. The pump set forth in claim 15 wherein said pawl is actuated by an electromagnet.

18. The pump set forth in claim 15 wherein said pawl is actuated through a Bowden wire.

19. A windshield cleaning system including, a washer unit, a wiper unit, means to effect operation of said washer unit for delivery of liquid solvent prior to initiating operation of the wiper unit, means automatically operative upon delivery of liquid solvent by the washer unit to set both units in operation for conjoint operation, and stroke counting means actuated during said conjoint operation and operable to automatically arrest the two units in sequential order that prolongs wiper unit operation for a predetermined number of strokes beyond washer unit operation.

20. A windshield cleaning system including, a wiper unit, a washer unit, means to actuate said washer unit independently of said wiper unit to deliver liquid solvent onto an associated windshield, means controlled automatically by said first recited means to set both units in operation for conjoint operation, stroke counting means operable during said conjoint operation to continue operation of the washer unit for a first predetermined number of strokes of said wiper unit and then automatically arrest the washer unit, and means including said stroke counting means to continue operation of the wiper unit for a second predetermined number of strokes after the washer unit has been arrested, and then automatically arresting said wiper unit.

References Cited in the file of this patent

UNITED STATES PATENTS 2,274,293    Horton _____ Feb. 24, 1942

FOREIGN PATENTS 1,111,220    France _____ Oct. 26, 1955